United States Patent [19]

Maier et al.

[11] Patent Number: 5,161,943

[45] Date of Patent: Nov. 10, 1992

[54] SWIRL CONTROL LABYRINTH SEAL

[75] Inventors: Martin D. Maier, Olean, N.Y.; Colin Osborne, Norwich, Vt.

[73] Assignee: Dresser-Rand Company, A General Partnership, Corning, N.Y.

[21] Appl. No.: 798,513

[22] Filed: Nov. 26, 1991

Related U.S. Application Data

[62] Division of Ser. No. 667,768, Mar. 11, 1991.

[51] Int. Cl.$^5$ ............................................. F04D 29/08
[52] U.S. Cl. ............................... 415/170.1; 415/174.5; 277/3; 277/27
[58] Field of Search ............... 415/170.1, 174.5, 172.1; 277/53, 75, 70, 3, 27

[56] References Cited

U.S. PATENT DOCUMENTS

| | | | |
|---|---|---|---|
| 1,966,855 | 7/1934 | Gregg | 230/132 |
| 2,846,245 | 8/1958 | Weaver | 286/10 |
| 2,990,202 | 6/1961 | Dennison | 286/19 |
| 3,119,623 | 1/1964 | Shevchenko | 277/27 |
| 3,411,794 | 11/1968 | Allen | 415/174.5 |
| 3,532,399 | 10/1970 | Gray | 308/36.4 |
| 3,752,607 | 8/1973 | Bilobran | 418/124 |
| 3,759,532 | 9/1973 | Lindeboom | 277/27 |
| 3,905,605 | 9/1975 | Hubner | 277/22 |
| 3,976,395 | 8/1976 | Kalnin et al. | 415/199 A |
| 4,057,362 | 11/1977 | Schwaebel | 415/174.5 |
| 4,132,416 | 1/1979 | Adams, Jr. | 277/18 |
| 4,386,780 | 6/1983 | Dernedde | 277/15 |
| 4,396,302 | 8/1983 | Drevet et al. | 384/121 |
| 4,511,149 | 4/1985 | Wiese | 277/27 |
| 4,513,975 | 4/1985 | Hauser et al. | 277/22 |
| 4,516,921 | 5/1985 | Kemp | 418/141 |
| 4,523,764 | 6/1985 | Albers et al. | 277/27 |
| 4,534,569 | 8/1985 | Ishitani et al. | 277/27 |
| 4,541,773 | 9/1985 | Drevet et al. | 415/111 |
| 4,838,559 | 6/1989 | Guardiani et al. | 277/27 |
| 4,976,444 | 12/1990 | Richards | 277/53 |

FOREIGN PATENT DOCUMENTS 688624 2/1940 Fed. Rep. of Germany .
58-84269 5/1983 Japan .

OTHER PUBLICATIONS

H. Benckert, et al., "Flow Induced Spring Coefficients of Labyrinth Seals for Application in Rotor Dynamics", pp. 189-212, NASA Publication 2133, Texas A&M Workshop, May 12-14, 1980.

Aziz A. Fozi, "An Examination of Gas Compressor Stability and Rotating Stall", publication of Solar Turbines Incorporated, San Diego, California, pp. 1-15.

Kanki, et al., "Theoretical and Experimental Study on the Destabilizing Force by Labyrinth Seal", Internal Conference on Rotordynamics, Tokyo, Japan, Sep. 14-17, 1986.

R. Gordon Kirk, "Evaluation of Aerodynamic Instability Mechanisms for Centrifugal Compressors", Paper 85-DET-147, ASME Design Engineering Division Conference and Exhibit on Mechanical Vibration and Noise, Cincinnati, Ohio, Sep. 10-13, 1985.

Primary Examiner—John T. Kwon
Attorney, Agent, or Firm—Richards, Medlock & Andrews

[57] ABSTRACT

A labyrinth seal is disclosed which reduces the inlet swirl and circumferential flow of fluid within the sealing cavity of a rotating shaft system. The primary purpose is to eliminate the destabilizing influence of the labyrinth seal which can induce rotor instability. This is accomplished by the addition of flow bypass passageways which extend from the high pressure face of the seal to the space between the first and second set of labyrinth teeth. The flow bypass passageways are equally spaced around the circumference of the seal and are inclined such that the fluid is introduced into the seal cavity at a desired orientation. Multiple sets of flow bypass passageways are also positioned at predetermined locations downstream from the first set of passages and function in a similar manner. Annular grooves are provided in the outer surface of the seal to connect each adjacent set of flow bypass passageways which straddle each set of labyrinth teeth.

37 Claims, 4 Drawing Sheets

SWIRL CONTROL LABYRINTH SEAL

This is a divisional of application Ser. No. 07/667,768, filed Mar. 11, 1991.

BACKGROUND OF THE INVENTION

This invention relates generally to labyrinth seals in turbo machinery or the like. More particularly, but not by way of limitation, this invention relates to improved labyrinth seals which reduce or eliminate the inlet swirl and/or circumferential flow of fluid within the labyrinth seals thereby reducing the destabilizing influence of labyrinth seals which can induce rotor instability.

Although this invention is applicable to numerous and various types of labyrinth seals, it has been found to be particularly useful in the environment of impeller covers and balance pistons or rotating elements of compressors. Therefore, without limiting the applicability of the invention to "labyrinth seals for impeller covers and balance pistons or rotating elements in compressors", the invention will be described in such environments.

The destabilizing influence of labyrinth seals is a major source of excitation leading to rotor instability in turbo machinery. The magnitude of this excitation is a function of the circumferential flow of fluid within the labyrinth seal and can be greatly reduced by eliminating or greatly reducing the inlet swirl associated with the labyrinth seal.

Studies have been done which indicate that in long labyrinth seals, fluids with zero inlet swirls can acquire a significant tangential velocity component as it traverses along the length of the labyrinth seal. The tangential velocity component is caused by the viscous drag effects from the rotating shaft or rotating element.

Attempts have been made, with some success, to reduce or eliminate the inlet swirl associated with division wall labyrinths in high pressure barrel compressors through the use of shunt holes which introduces fluid from a region of high pressure into a region within the seal cavity. This concept has not been used in other labyrinths partly because of the complex drilling required in the diaphragms, volutes, housings, etc.

The present invention provides an improved labyrinth seal which reduces or eliminates the inlet swirl and the tangential velocity component as the fluid traverses the labyrinth seal by the use of a plurality of bypass passageways in the labyrinth seal positioned at specific locations in the seal to provide an alternate flow path for the fluid.

SUMMARY OF THE INVENTION

This invention provides an improved annular labyrinth seal element for turbo machinery which reduces or eliminates the inlet swirl and/or circumferential flow of fluid within the labyrinth seal and thereby reduces the destabilizing influence of labyrinth seals which can induce rotor instability. This is achieved in accordance herewith by the addition of flow bypass passageways from the annular end of the seal, exposed to the high pressure, to the space after the first tooth or first series of teeth. The flow bypass passageways are equally spaced around the circumference of the labyrinth seal and are inclined at an acute angle with respect to a radial reference line from the rotating element. The sizes and number of flow bypass passageways are selected such that the flow resistance of the flow bypass passageways are at least an order of magnitude below the flow resistance across the first seal tooth. Most of the fluid will enter the labyrinth seal through the flow bypass passageways rather than across the first tooth or series of teeth, thereby eliminating inlet swirl.

Another embodiment provides multiple sets of flow bypass passageways installed at predetermined locations downstream from the annular end of the seal which is exposed to the high pressure. At least one annular groove is machined into the outer surface of the labyrinth- seal to connect each adjacent set of flow bypass passageways which straddle a predetermined labyrinth tooth or set of teeth. Sealing means are installed between each set of annular grooves. The flow bypass passageways are equally spaced around the circumference of the labyrinth seal and are inclined at an acute angle with respect to a radial reference line from the rotating element. The sizes and number of flow bypass passageways are selected such that the flow resistance of the flow bypass passageways are at least an order of magnitude below the flow resistance across the particular labyrinth tooth which the passageways straddle. Most of the fluid will flow through the flow bypass passageways, rather than across the interposing labyrinth tooth, thereby eliminating the tangential velocity component of the fluid.

BRIEF DESCRIPTION OF THE DRAWINGS

Other advantages and features of the invention will become more apparent with reference to the following detailed description of a presently preferred embodiment thereof in connection with the accompanying drawings, wherein like reference numerals have been applied to like elements, in which.

DETAILED DESCRIPTION

Figure 1:
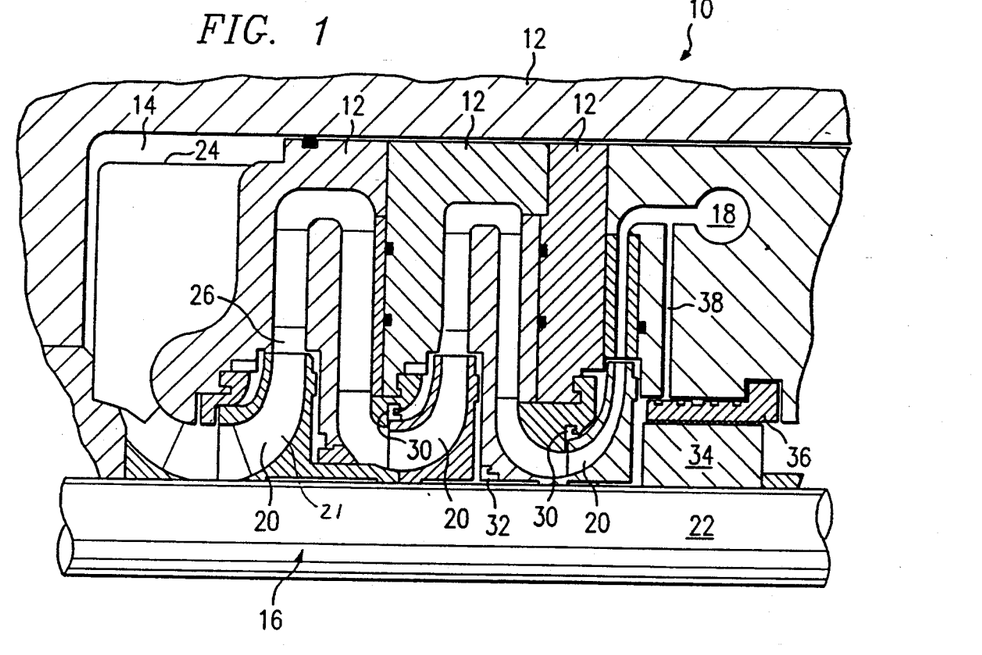
FIG. 1 is a partial, cross-sectional view of a multistage compressor including improved labyrinth seals that are constructed in accordance with the invention.

Referring to the drawing and FIG. 1 in particular, shown therein and generally designated by the reference character 10 is a centrifugal fluid impeller apparatus such as a multistage centrifugal gas compressor incorporating annular labyrinth seal elements that are constructed in accordance with the invention. It is to be understood that the type of compressor shown is not in any manner restrictive of the applications of the various annular labyrinth seal elements. For purposes of clarity, the various parts of the centrifugal fluid impeller apparatus, as well as the annular labyrinth seal elements, are shown as sectional views of an upward portion thereof, it being realized that such elements are symmetrically oriented entirely around the rotatable shaft.

The centrifugal fluid impeller apparatus 10 comprises a housing 12 defining a flow path extending from an inlet 14 in communication with a plurality of stages 16 leading to a discharge outlet 18. Comprising stages 16 are a plurality of axially spaced impellers 20 secured to a rotatable shaft 22. The gas is initially introduced to the first impeller 21 via a pair of stationary vanes 24. The plurality of stages 16 are arranged in series flow communication with each other and each impeller 20 discharges a high velocity gas at its periphery. Energy transmitted to the gas creates a pressure rise as flow velocity decreases in the diffuser section 26 immediately downstream of the impeller 20. Between each impeller stage is a portion of housing 12 providing support for the stationary elements utilized between impellers 20 such as diffuser faces, guide vanes, return bend and labyrinth seal elements 30 and 32 which seal elements are constructed in accordance with this invention.

Also attached to rotatable shaft 22 is balance piston or rotating element 34 to provide a counteracting axial thrust to that axial thrust of the rotatable shaft 22 caused and provided by the axially spaced impellers 20. Labyrinth seal element 36 is attached to a portion of housing 12 and extends into sealing relationship with the radially adjacent surface of balance piston or rotating element 34. In one embodiment, shunt hole 38 bleeds higher pressure gas from the discharge outlet 18 into a predetermined area or cavity of labyrinth seal element 36, details of which will be discussed below with reference to FIG. 10.

The destabilizing influence of labyrinth seals is a major source of excitation leading to rotor dynamic instability. The magnitude of this excitation is a function of the circumferential flow of the gas within the labyrinth seal. This excitation can be greatly reduced by eliminating the inlet swirl. The present invention provides means for reducing the inlet swirl where the implementation is confined to the labyrinth seal itself. In this manner, it will be more practical to install means for reducing inlet swirl in labyrinth seals and is especially conducive to field retrofits of labyrinth seals.

Figure 2:
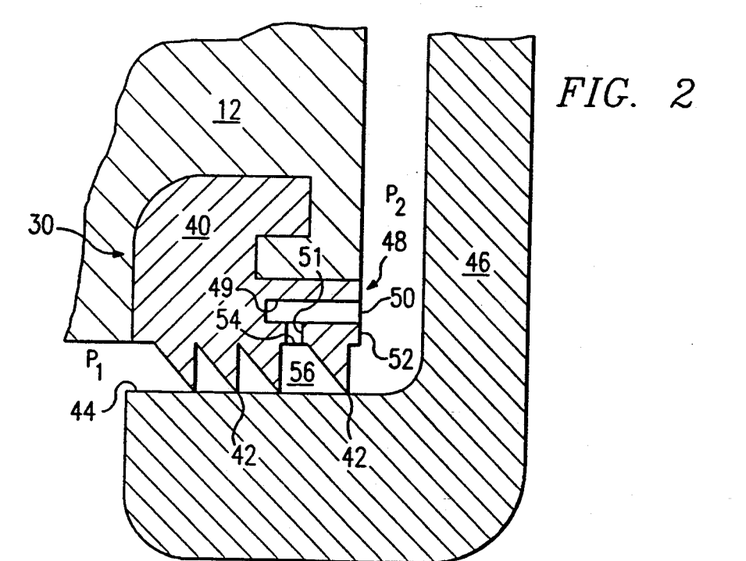
FIG. 2 is a partial, cross-sectional view of one embodiment of a labyrinth seal constructed in accordance with the invention.

FIG. 2 illustrates an impeller cover labyrinth seal assembly 30 which is constructed in accordance with the present invention. Labyrinth seal assembly 30 comprises a body portion 40 and multiple annular teeth or ridge-like elements 42 extending radially into sealing relationship with the radially adjacent surface 44 of impeller cover 46 of impeller 20. A first plurality of flow bypass passageways 48 are formed in body portion 40 and extend from a respective one of a first plurality of openings or holes 50 in the first annular end 52 to a respective one of a second plurality of openings or holes 54 located in the space or chamber 56 formed between the first adjacent pair (the first tooth and second tooth) of teeth or ridge-like elements 42. In other words, space or chamber 56 is on the low pressure ($P_1$) side of the first annular tooth 42 adjacent to the high pressure ($P_2$) area. Each flow bypass passageway 48 comprises a first portion 49, which extends generally parallel to the longitudinal axis of the rotatable shaft 22, and a second portion 51, which extends generally radially with respect to rotatable shaft 22 and impeller cover 46.

The openings or holes 50 are equally spaced around the circumference of the labyrinth seal element 30. Openings or holes 54 are also equally spaced around the periphery of space or chamber 56. Second portions 51 of flow bypass passageways 48 that introduce the fluid to the space or chamber 56 between the first or subsequent adjacent pair of labyrinth teeth 42 are inclined with respect to a radial reference line by angle $\theta$ as will be discussed and shown with reference to FIG. 7. The angle $\theta$ can have a range of $-90°$ to $+90°$, although for most practical applications, the angle $\theta$ will be between $0°$ to $+90°$ so the fluid will be entering space or chamber 56 opposite to the rotation of the impeller cover 46 and shaft 22. It will be appreciated that if the shaft 22 is rotating in the opposite direction then the angle $\theta$ will be between $-90°$ and $0°$. The size and number of openings or holes 50, flow bypass passageways 48 and openings or holes 54 are selected such that the flow resistance to a fluid flowing therethrough from $P_2$ to $P_1$ is at least an order of magnitude below the flow resistance to a fluid flowing between the first annular tooth or ridge-like element 42 and radially adjacent surface 44 from $P_2$ to $P_1$. In this structure, most of the fluid will enter the labyrinth seal element 30 through the openings or holes 50, flow bypass passageways 48 and openings or holes 54 rather than across the first annular tooth 42 (the tooth adjacent to the high pressure $P_2$ area) thereby greatly reducing, if not eliminating, the inlet swirl associated with the labyrinth seal element 30.

This inventive concept is different in that the openings or holes and flow bypass passageways provide an alternate flow path for the fluid. Fluid-flow through this inventive swirl control labyrinth can be represented by the following electrical analogy with reference to FIG. 3.

Figure 3:
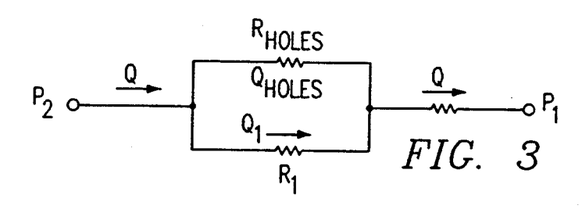
FIG. 3 is an electrical schematic representing the electrical analogy with respect to the fluid flow through the invention.

Where:
Q holes = Flow through the openings and passageways
$Q_1$ = Flow past the first labyrinth tooth
Q = Total flow through the labyrinth seal
R holes = Flow resistance of the openings and passageways
$R_1$ = Flow resistance of the first labyrinth tooth
$R_2$ = Flow resistance of the remaining labyrinth teeth
Basic relation:
P = Q·R (electrical analogy: V = I·R)

$$P_2 - P_1 = Q \cdot \left[ R_2 + \frac{R \text{ holes} \cdot R_1}{R \text{ holes} + R_1} \right]$$

and $$Q \text{ holes} = \frac{R_1}{R \text{ holes}} \cdot Q_1$$

From the above relation, it can be seen that if the flow resistance of the openings or holes and passageways are 1/10th that of the first labyrinth tooth, the fluid flow through the openings and passageways will be ten times as great as the flow past the first labyrinth tooth. Reducing the destabilizing influences of labyrinth seal elements will minimize the chances of encountering costly rotor stability problems, particularly when a machine is operating in "off design" conditions such as surge.

Figure 4:
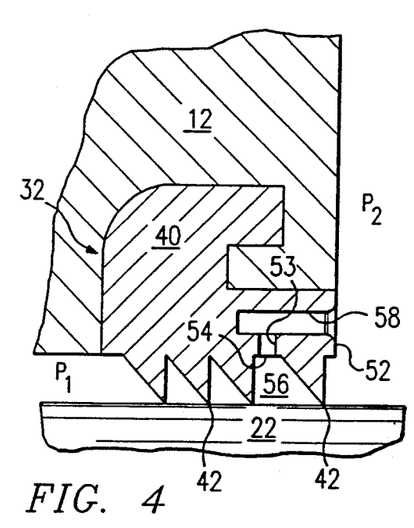
FIG. 4 is a partial, cross-sectional view of another embodiment of a labyrinth seal constructed in accordance with the invention; o
Figure 5:
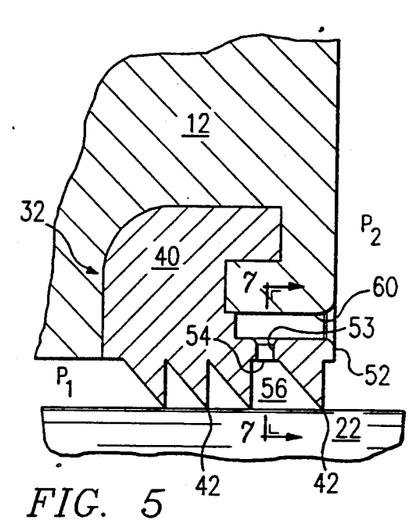
FIG. 5 is a partial, cross-sectional view of another embodiment of a labyrinth seal constructed in accordance with the invention.
Figure 6:
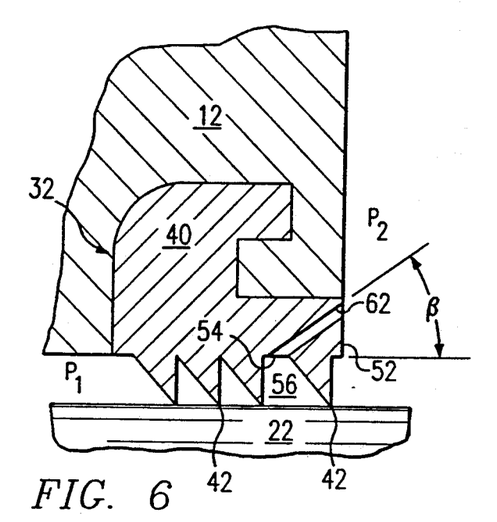
FIG. 6 is a partial, cross-sectional view of another embodiment of a labyrinth seal constructed in accordance with the invention.

FIGS. 4-6 disclose additional embodiments of the inventive concept which can be used with the impeller cover 46 or shaft 22.

With reference to FIG. 4, the primary change from the embodiment of FIG. 2 is that first portion 49 of flow bypass passageways 48 and a first plurality of openings or holes 50 have been replaced by an annular slot 58 formed in first annular end 52 around the circumference of the labyrinth seal element 32. Annular slot 58 is oriented generally perpendicular to the first annular end 52. Flow bypass passageways 53 extend from annular slot 58 to a respective one of the plurality of openings or holes 54. Flow bypass passageways 53 in this embodiment, as the second portions 51 of flow bypass passageways 48 in FIG. 2, are inclined with respect to a radial reference by an angle $\theta$.

With reference to FIG. 5, annular slot 58 in FIG. 4 has been replaced by an annular groove 60 formed in first annular end 52 around the circumference of the labyrinth seal element 32. Annular groove 60 is oriented generally perpendicular to first annular end 52. Flow bypass passageways 53 extend from annular groove 60 to a respective one of the plurality of openings or holes 54. Flow bypass passageways 53 are inclined with respect to a radial reference by an angle $\theta$. The end of flow bypass passageways 53 which communicate with annular groove 60 is flared to reduce resistance to the flow of fluid therethrough.

With reference to FIG. 6, a first plurality of slanted flow bypass passageways 62 are formed in body portion 40 and extend from a respective one of a first plurality of openings or holes 50 in the first annular end 52 to a respective one of a second plurality of openings or holes 54 located in the space or chamber 56 formed between the first adjacent pair of annular teeth or ridge$ like elements 42. Slanted flow bypass passageways are oriented generally at an acute angle $\beta$ of 45°.

In FIGS. 2, 4, 5, and 6, the flow bypass passageways have been shown as bypassing or straddling the first tooth of the labyrinth seal. It will be appreciated that the flow bypass passageways could bypass or straddle more than just the first tooth with space or chamber 56 being formed between the second and third tooth or between the third and fourth tooth, etc.

Figure 7:
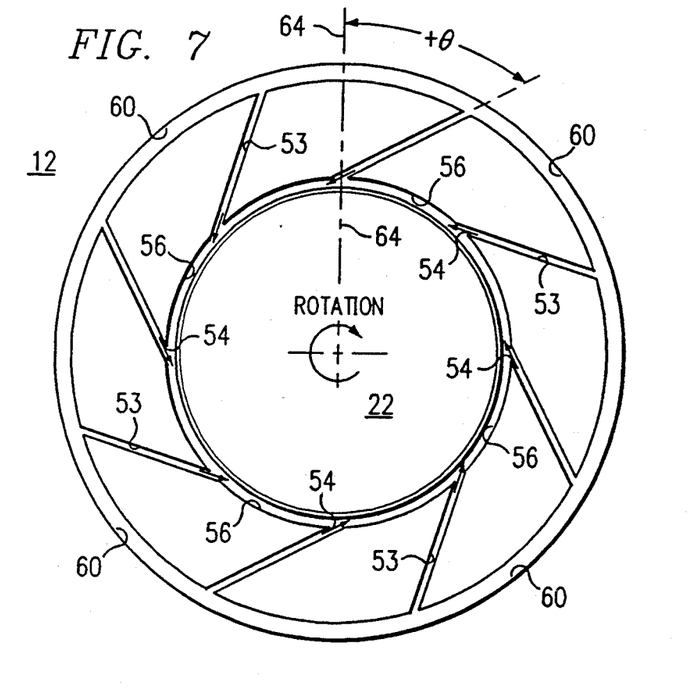
FIG. 7 is cross-sectional view taken along the line 7—7 of FIG. 5.

The cross-section shown in FIG. 7, which is taken along line 7—7 of FIG. 5, further illustrates the structural details of a labyrinth seal element constructed in accordance with the invention. Radial reference line 64 is shown as being vertical but it will be appreciated that the flow bypass passageways 53 will still be at the angle $\theta$ with respect to any radial line. As was previously mentioned, angle $\theta$ can be from $-90°$ to $+90°$. Angle $\theta$ as shown in FIG. 7 is approximately $+60°$ with the fluid flow being from annular groove 60 through the plurality of flow bypass passageways 53 to space or chamber 56. The flow of fluid being against or opposite to the direction of rotation of the periphery of rotatable shaft 22.

Figure 8:
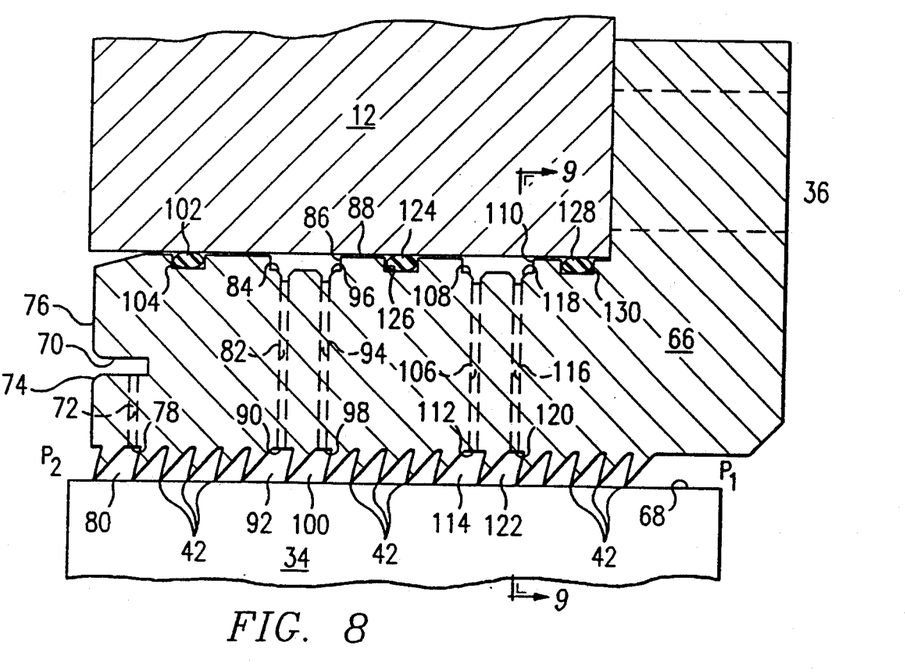
FIG. 8 is a partial, cross-sectional view of another embodiment of a labyrinth seal constructed in accordance with the invention.

The cross-section shown in FIG. 8, illustrates the structural details of a balance piston labyrinth seal element 36 constructed in accordance with the invention. As is evident, labyrinth seal element 36 is longer than labyrinth seal elements 30 and 32. It has been determined that in longer labyrinth seal elements, fluids with zero inlet swirl can acquire a large tangential velocity component as it traverses the seal element, caused by the viscous drag effects from the rotating shaft. This invention provides the means for eliminating this acquired swirl at one or more locations along the length of the labyrinth seal element Labyrinth seal assembly 36 comprises a body portion 66 and multiple annular teeth or ridge-like elements 42 extending radially into sealing relationship with the radially adjacent surface 68 of balance piston or rotating element 34.

A first plurality of flow bypass passageways 71 are formed in body portion 66 and extend from a respective one of a first plurality of openings or holes 74 in the first annular end 76 to a respective one of a second plurality of openings or holes 78 located in the space or chamber 80 formed between the first adjacent pair of annular teeth for ridge-like elements 42. Each flow bypass passageway 71 comprises a first portion 70, which extends generally parallel to the longitudinal axis of the rotatable shaft 22, and a second portion 72, which extends generally radially with respect to rotatable shaft 22 and balance piston or rotating element 34. The orientation, size and spacing of the flow bypass passageway 71 and openings or holes 74 and 78 are the same as that disclosed in the embodiment of FIG. 2 and thereby greatly reduces or eliminates the inlet swirl associated with labyrinth seal element 36 just as do the embodiments disclosed in FIGS. 2, 4, 5 and 6.

In addition, multiple sets of flow bypass passageways are installed at predetermined locations downstream from the first annular end 76 of labyrinth seal element 36. In particular, a second plurality of flow bypass passageways 82 are formed in and extends across body portion 66 from a respective one of a third plurality of circumferentially spaced-apart openings or holes 84 formed in a first annular groove 86 formed in the circumferentially extending outer surface 88 of the labyrinth seal element 36 to a respective one of a fourth plurality of circumferentially spaced-apart openings or holes 90 located in the space or chamber 92 formed between a second adjacent pair of annular teeth 42. In the preferred embodiment, the second adjacent pair of annular teeth 42 comprises the sixth and seventh annular teeth 42 from the first annular end 76. The second plurality of flow bypass passageways 82 need not be inclined with respect to a radial reference line but may be if desired for any reason.

A third plurality of flow bypass passageways 94 are formed in and extend across body portion 66 from a respective one of a fifth plurality of circumferentially spaced-apart openings or holes 96 formed in first annular groove 86 to a respective one of a sixth plurality of circumferentially spaced-apart openings 98 located in the space or chamber 100 formed between a third adjacent pair of annular teeth 42. In the preferred embodiment, the third adjacent pair of annular teeth comprises the seventh and eighth annular teeth 42 from the first annular end 76. The third plurality of flow bypass passageways 94 are inclined with respect to a radial reference line by an angle $\theta$ with the angle $\theta$ having a range of from $-90°$ to $+90°$. The fluid will be flowing from space or chamber 92 out through the second plurality of flow bypass passageways 82, across first annular groove 86 and in through the third plurality of flow bypass passageways 94 to space or chamber 100. For most applications, the angle $\theta$ will be between 0° and $+90°$ so the fluid will be entering space or chamber 100 opposite to the rotation of the balance piston or rotating element 34.

The plurality of circumferentially spaced-apart openings or holes 84, 90, 96 and 98 as well as the plurality of flow bypass passageways 82 and 94 are equally spaced around the circumference of the labyrinth seal element 36. The size and number of openings or holes 84, 90, 96 and 98 and flow bypass passageways 82 and 94 are selected such that the flow resistance to a fluid flowing therethrough from space or chamber 92 to space or chamber 100 is at least an order of magnitude below the flow resistance to a fluid flowing, from space or chamber 92 to space or chamber 100, through the annular space between the radially adjacent surface 68 of balance piston or rotating element 34 and the annular tooth 42 positioned between space or chamber 92 and 100. In this way, most of the fluid will flow through the plurality of flow bypass passageways rather than across the interposing annular tooth, thereby eliminating the tangential velocity component of the fluid.

A first annular sealing means 102 is provided for sealing purposes in the form of an O-ring gasket and is positioned in a second annular groove or slotted recess 104 which is positioned between first annular groove 86 and first annular end 76.

A fourth plurality of flow bypass passageways 106 are formed in and extends across body portion 66 from a respective one of a seventh plurality of circumferentially spaced-apart openings or holes 108 formed in a third annular groove 110 in the circumferentially extending outer surface 88 to a respective one of an eighth plurality of circumferentially spaced-apart openings or holes 112 located in the space or chamber 114 formed between a fourth adjacent pair of annular teeth 42. In the preferred embodiment, the fourth adjacent pair of annular teeth 42 comprises the twelfth and thirteenth annular teeth 42 from the first annular end 76.

A fifth plurality of flow bypass passageways 116 are formed in and extend across body portion 66 from a respective one of a ninth plurality of circumferentially spaced-apart openings or holes 118 formed in third annular groove 110 to a respective one of a tenth plurality of circumferentially spaced-apart openings or holes 120 located in the space or chamber 122 formed between a fifth adjacent pair of annular teeth 42. In the preferred embodiment, the fifth adjacent pair of annular teeth comprises the thirteenth and fourteenth annular teeth 42 from the first annular end 76.

A second annular sealing means 124 in the form of an O-ring gasket is positioned in a fourth annular groove or slotted recess 126 which is positioned between first annular groove 86 and third annular groove 110.

A third annular sealing means 128 in the form of an O-ring gasket is positioned in a fifth annular groove or slotted recess 130 which is positioned between third annular groove 110 and second annular end 132 of labyrinth seal element 36.

The plurality of circumferentially spaced-apart openings or holes 108, 112, 118 and 120 together with the plurality of flow bypass passageways 106 and 116 function to eliminate the tangential velocity component of the fluid the same as previously discussed regarding the plurality of openings 84, 90, 96 and 98 together with the flow bypass passageways 82 and 94.

Figure 9:
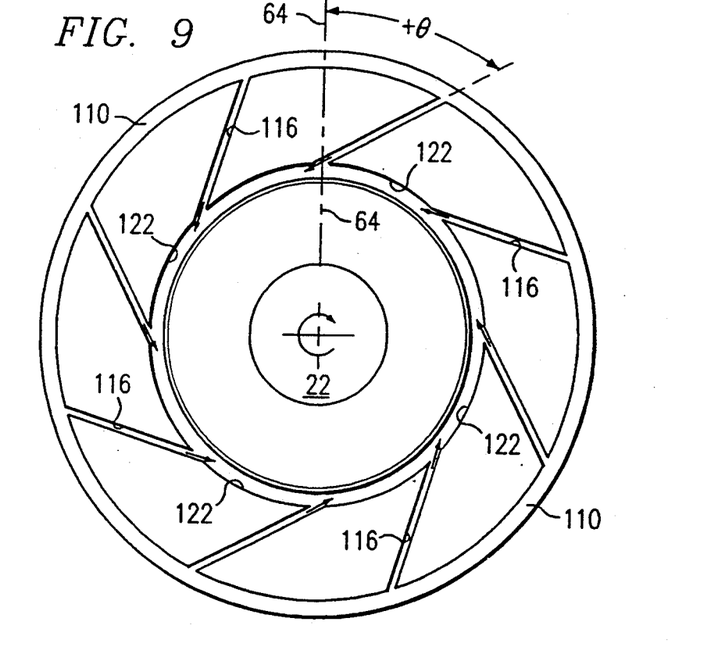
FIG. 9 is a cross-sectional view taken along the line 9—9 of FIG. 8.

The cross-section shown in FIG. 9, which is taken along line 9—9 of FIG. 8, further illustrates the structural details of a labyrinth seal element used in conjunction with a balance piston. The fluid flow is from annular groove 110 through the plurality of flow bypass passageways 116 to space or chamber 122. The flow of fluid being against or opposite to the direction of rotation of rotatable shaft 22 and balance piston or rotating element 34.

Figure 10:
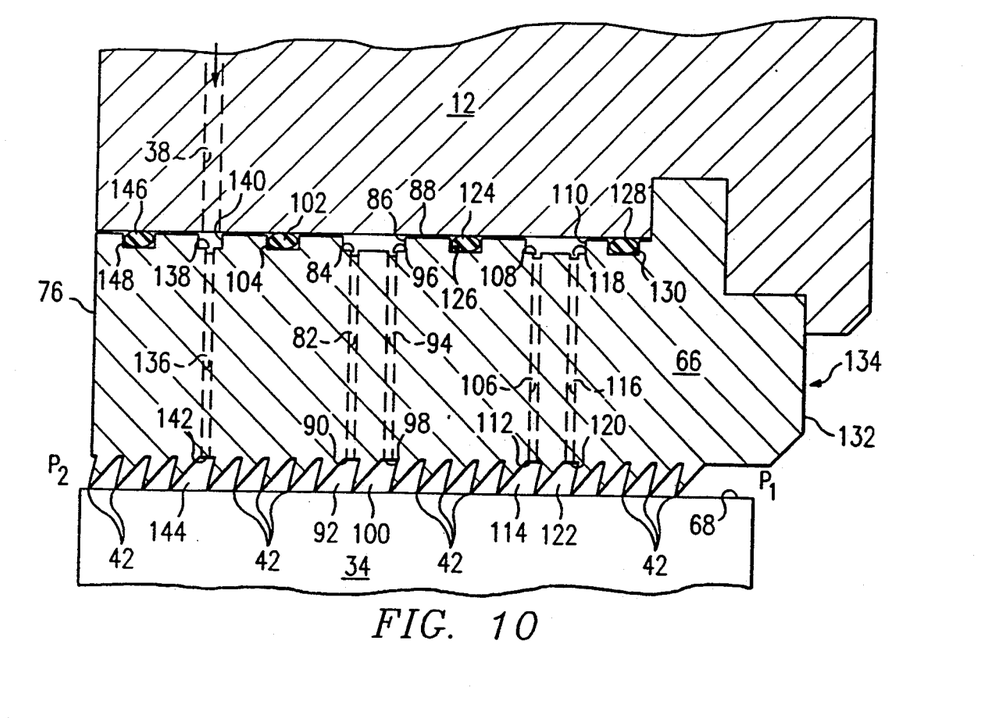
FIG. 10 is a partial, cross-sectional view of another embodiment of a labyrinth seal constructed in accordance with the invention.

The cross-section shown in FIG. 10 illustrates an additional embodiment of a balance piston labyrinth seal element 134 and further includes a sixth plurality of flow bypass passageways 136 formed in and extending across body portion 66 from a respective one of an eleventh plurality of circumferentially spaced-apart openings or holes 138 formed in a sixth annular groove 140 formed in the circumferentially extending outer surface 88 to a respective one of a twelfth plurality of circumferentially spaced-apart openings or holes 142 located in the space or chamber 144 formed between a sixth adjacent pair of annular teeth 42. In the preferred embodiment, the sixth adjacent pair of annular teeth comprises the fourth and fifth annular teeth 42 from the first annular end 76. Shunt hole 38 is formed in housing 12 and connects sixth annular groove 140 to the discharge outlet 18 to introduce higher pressure gas from the discharge outlet into space or chamber 144 to eliminate or greatly reduce the inlet swirl.

A fourth annular sealing means 146 in the form of an O-ring gasket is positioned in a seventh annular groove or slotted recess 148 which is positioned between sixth annular groove 140 and first annular end 76.

From the foregoing detailed description, it can be appreciated that a labyrinth seal element constructed in accordance with the invention provides an improved labyrinth seal element which reduces or eliminates the inlet swirl and/or circumferential flow of fluid within the labyrinth seal and thereby reduces the destabilizing influence of labyrinth seals on rotor stability. It will be appreciated that although the FIGURES depict various labyrinth seals with the teeth contained on the stationary component, the teeth could also be mounted on the rotating component with the bypass passageways still located in the stationary component.

Although the present invention has been described with reference to a presently preferred embodiment, it will be appreciated by those skilled in the art that various modifications, alternatives, variations, etc., may be made without departing from the spirit and scope of the invention as defined in the appended claims.

I claim:

1. An apparatus comprising:

a housing, a low pressure chamber in said housing for containing a fluid at a low pressure, a high pressure chamber in said housing for containing said fluid at a high pressure;

a rotatable shaft positioned in said housing, said rotatable shaft constituting a rotatable element;

an annular labyrinth seal element positioned coaxially with said rotatable shaft and between a rotatable element and said housing, said annular labyrinth seal element having a first annular surface and a second annular surface, said annular labyrinth seal element having a plurality of annular teeth on said first annular surface, said plurality of annular teeth facing a radially adjacent surface, said annular labyrinth seal element having a first annular end exposed to said high pressure chamber and a second annular end exposed to said low pressure chamber, said annular teeth being spaced along the longitudinal length of said annular labyrinth seal element between said first and second annular ends, said annular teeth extending radially into sealing relationship with said radially adjacent surface such that a portion of said fluid passes from said high pressure chamber at said first annular end through the annular space between said annular teeth and said radially adjacent surface to said low pressure chamber at said second annular end with the rotation of said rotatable shaft tending to cause a circumferential flow of said portion of said fluid as said portion of said fluid passes through said annular space;

a first annular groove, said first annular groove being located in said second annular surface of said annular labyrinth seal element;

a first plurality of circumferentially spaced-apart openings, said first plurality of circumferentially spaced-apart openings being located in said first annular groove;

a second plurality of circumferentially spaced-apart openings, said second plurality of circumferentially spaced-apart openings being located in said first annular groove;

a third plurality of circumferentially spaced-apart openings, said third plurality of circumferentially spaced-apart openings being located in the space between a first predetermined adjacent pair of said annular teeth;

a fourth plurality of circumferentially spaced-apart openings, said fourth plurality of circumferentially spaced-apart openings being located in the space between a second predetermined adjacent pair of said annular teeth, said first predetermined adjacent pair of said annular teeth being located between said first annular end and said second predetermined adjacent pair of said annular teeth;

a first plurality of flow bypass passageways, each of said first plurality of flow bypass passageways extending from a respective one of said first plurality of circumferentially spaced-apart openings to a respective one of said third plurality of circumferentially spaced-apart openings;

a second plurality of flow bypass passageways, each of said second plurality of flow bypass passageways extending from a respective one of said second plurality of circumferentially spaced-apart openings to a respective one of said fourth plurality of circumferentially spaced-apart openings;

wherein the resistance to fluid flow from said third plurality of circumferentially spaced-apart openings through said first plurality of flow bypass passageways, said first annular groove and said second plurality of flow bypass passageways to said fourth plurality of circumferentially spaced-apart openings is substantially less than the resistance of fluid flow through the annular space defined by said radially adjacent surface and the annular teeth located between said third plurality of circumferentially spaced-apart openings and said fourth plurality of circumferentially spaced-apart openings.

2. An apparatus in accordance with claim 1, further comprising first and second annular sealing means for sealing the annular space between the second annular surface of said annular labyrinth seal element and a surface which is radially adjacent to said second annular surface of said annular labyrinth seal element, said first annular sealing means being located between said first annular end and said first annular groove, said first annular groove being located between said first annular sealing means and said second annular sealing means.

3. An apparatus in accordance with claim 2 wherein said first annular sealing means comprises an O-ring positioned in a second annular groove formed in the second annular surface of said annular labyrinth seal element, and wherein said second annular sealing means comprises an O-ring positioned in a third annular groove formed in the second annular surface of said annular labyrinth seal element.

4. An apparatus in accordance with claim 1 wherein each of said second plurality of flow bypass passageways extends radially with respect to the longitudinal axis of said rotatable shaft.

5. An apparatus in accordance with claim 1 wherein each of said second plurality of flow bypass passageways extends at an acute angle to a radial line extending from the longitudinal axis of said rotatable shaft through the respective associated one of said fourth plurality of circumferentially spaced-apart openings located in the space between said second predetermined adjacent pair of annular teeth, said acute angle being in a plane which is perpendicular to the longitudinal axis of said rotatable shaft.

6. An apparatus in accordance with claim 5 wherein the direction of flow of fluid exiting the second plurality of flow bypass passageways is counter to the direction of rotation of said rotatable shaft.

7. An apparatus in accordance with claim 1 wherein each of said first and second plurality of flow bypass passageways is located entirely within said annular labyrinth seal element.

8. An apparatus in accordance with claim 1 wherein said annular labyrinth seal element further includes:

a second annular groove, said second annular groove being located in said second annular surface of said annular labyrinth seal element between said first annular groove and said second annular end;

a fifth plurality of circumferentially spaced-apart openings, said fifth plurality of circumferentially spaced-apart openings being located in said second annular groove;

a sixth plurality of circumferentially spaced-apart openings, said sixth plurality of circumferentially spaced-apart openings being located in said second annular groove;

a seventh plurality of circumferentially spaced-apart openings, said seventh plurality of circumferentially spaced-apart openings being located in the space between a third predetermined adjacent pair of said annular teeth;

an eighth plurality of circumferentially spaced-apart openings, said eighth plurality of circumferentially spaced-apart openings being located in the space between a fourth predetermined adjacent pair of said annular teeth, said third predetermined adjacent pair of said annular teeth being located between said second annular end and said second predetermined adjacent pair of said annular teeth, said fourth predetermined adjacent pair of said annular teeth being located between said second annular end and said third predetermined adjacent pair of said annular teeth;

a third plurality of flow bypass passageways, each of said third plurality of flow bypass passageways extending from a respective one of said fifth plurality of circumferentially spaced-apart openings to a respective one of said seventh plurality of circumferentially spaced-apart openings;

a fourth plurality of flow bypass passageways, each of said fourth plurality of flow bypass passageways extending from a respective one of said sixth plurality of circumferentially spaced-apart openings to a respective one of said eighth plurality of circumferentially spaced-apart openings;

wherein the resistance to fluid flow from said seventh plurality of circumferentially spaced-apart openings through said third plurality of flow bypass passageways, said second annular groove and said fourth plurality of flow bypass passageways to said eighth plurality of circumferentially spaced-apart openings is substantially less than the resistance of fluid flow through the annular space defined by said radially adjacent surface and the annular teeth located between said seventh plurality of circumferentially spaced apart openings and said eighth plurality of circumferentially spaced-apart openings.

9. An apparatus in accordance with claim 8, wherein each of said annular teeth is inclined at an acute angle in the direction of said first annular end, wherein said fourth plurality of circumferentially spaced-apart openings located in the space between said second predetermined adjacent pair of said annular teeth are at least substantially uniformly spaced about the circumference of the space between said second predetermined adjacent pair of said annular teeth, and wherein said eighth plurality of circumferentially spaced-apart openings located in the space between said fourth predetermined adjacent pair of said annular teeth are at least substantially uniformly spaced about the circumference of the space between said fourth predetermined adjacent pair of said annular teeth.

10. An apparatus in accordance with claim 8, further comprising first, second, and third annular sealing means for sealing the annular space between the second annular surface of said annular labyrinth seal element and a surface which is radially adjacent to said second annular surface of said annular labyrinth seal element, said first annular sealing means being located between said first annular end and said first annular groove, said second annular sealing means being located between said first annular groove and said second annular groove, said third annular sealing means being located between said second annular groove and said second annular end.

11. An apparatus in accordance with claim 10 wherein said first annular sealing means comprises an O-ring positioned in a third annular groove formed in the second annular surface of said annular labyrinth seal element, wherein said second annular sealing means comprises an O-ring positioned in a fourth annular groove formed in the second annular surface of said annular labyrinth seal element, and wherein said third annular sealing means comprises an O-ring positioned in a fifth annular groove formed in the second annular surface of said annular labyrinth seal element.

12. An apparatus in accordance with claim 8 wherein an annular rotating element is positioned coaxially on said rotatable shaft, said annular rotating element constituting a rotatable element, wherein said annular labyrinth seal element is secured to said housing, and wherein said radially adjacent surface is a portion of the circumferentially extending outer surface of said annular rotating element.

13. An apparatus in accordance with claim 8 wherein each of said first, second, third, and fourth plurality of flow bypass passageways extends radially with respect to the longitudinal axis of said rotatable shaft.

14. An apparatus in accordance with claim 8 wherein each of said second plurality of flow bypass passageways extends at a first acute angle to a radial line extending from the longitudinal axis of said rotatable shaft through the respective associated one of said fourth plurality of circumferentially spaced-apart openings located int he space between the second predetermined adjacent pair of annular teeth, each said first acute angle being in a plane which is perpendicular to the longitudinal axis of said rotatable shaft, and wherein each of said fourth plurality of flow bypass passageways extends at a second acute angle to a radial line extending from the longitudinal axis of said rotatable shaft through the respective associated one of said eighth plurality of circumferentially spaced-apart openings located in the space between the fourth predetermined adjacent pair of annular teeth, each said second acute angle being in a plane which is perpendicular to the longitudinal axis of said rotatable shaft.

15. An apparatus in accordance with claim 14 wherein the direction of flow of fluid exiting each of the second and fourth plurality of flow bypass passageways is counter to the direction of rotation of said rotatable shaft.

16. An apparatus in accordance with claim 8 further comprising a fifth plurality of flow bypass passageways, each of said fifth plurality of flow bypass passageways being stationary and extending from a predetermined opening in said high pressure chamber to a respective one of a ninth plurality of circumferentially spaced-apart openings, said ninth plurality of circumferentially spaced-apart openings being located in an annular chamber formed between a fifth predetermined adjacent pair of said annular teeth, said fifth predetermined adjacent pair of said annular teeth being located between said first predetermined adjacent pair of said annular teeth and said first annular end, said ninth plurality of circumferentially spaced-apart openings being spaced at least substantially uniformly about the circumference of said annular chamber, wherein the flow resistance from said high pressure chamber through said fifth plurality of flow bypass passageways to said annular chamber is substantially less than the flow resistance through the portion of said annular space from said first annular end to said annular chamber, thereby reducing the circumferential flow of said portion of said fluid passing from said high pressure chamber through said annular space to said low pressure chamber.

17. An apparatus in accordance with claim 16, wherein said annular labyrinth seal element is secured to said housing, and wherein said radially adjacent surface comprises an annular portion of a circumferentially extending outer surface of said rotatable shaft.

18. An apparatus in accordance with claim 16 wherein said fifth predetermined adjacent pair of said annular teeth includes the one of said annular teeth which is closest to said first annular end.

19. An apparatus in accordance with claim 16, wherein each of said first, second, third, fourth and fifth plurality of flow bypass passageways is located entirely in said annular labyrinth seal element.

20. An apparatus in accordance with claim 19, further comprising first, second, and third annular sealing means for sealing the annular space between the second annular surface of said annular labyrinth seal element and a surface which is radially adjacent to said second annular surface of said annular labyrinth seal element, said first annular sealing means being located between said first annular end and said first annular groove, said second annular sealing means being located between said first annular groove and said second annular groove, said third annular sealing means being located between said second annular groove and said second annular end.

21. An apparatus in accordance with claim 19, wherein said predetermined opening in said high pressure chamber comprises a plurality of openings in said first annular end which are spaced at least substantially uniformly in a circular array, corresponding in number to said fifth plurality of flow bypass passageways, each of said fifth plurality of flow bypass passageways having a first portion extending at least generally parallel to the longitudinal axis of said rotatable shaft to intersect a respective one of the plurality of openings in said first annular end and having a second portion extending from a respective one of said ninth plurality of circumferentially spaced-apart openings in said annular chamber to intersect the associated first portion.

22. An apparatus in accordance with claim 21 wherein said second portion of each of said fifth plurality of flow bypass passageways is inclined with respect to a reference line at an angle of inclination such that fluid enters said annular chamber from the respective one of said fifth plurality of flow bypass passageways in a direction opposite to the rotation of said rotatable shaft, said reference line being radial to said rotatable shaft.

23. An apparatus in accordance with claim 8 further comprising a third annular groove, said third annular groove being located in said second annular surface of said annular labyrinth seal element, a ninth plurality of circumferentially spaced-apart openings, said ninth plurality of circumferentially spaced-apart openings being located in said third annular groove; an inlet passageway extending from an opening in said high pressure chamber to said third annular groove, a fifth plurality of flow bypass passageways, each of said fifth plurality of flow bypass passageways extending from a respective one of said ninth plurality of circumferentially spaced-apart openings in said third annular groove to a respective one of a tenth plurality of circumferentially spaced-apart openings, said tenth plurality of circumferentially spaced-apart openings being located in an annular chamber formed between a fifth predetermined adjacent pair of said annular teeth, said fifth predetermined adjacent pair of said annular teeth being located between said first predetermined adjacent pair of said annular teeth and said first annular end, said tenth plurality of circumferentially spaced-apart openings being spaced at least substantially uniformly about the circumference of said annular chamber, wherein the flow resistance from said high pressure chamber through said inlet passageway and said fifth plurality of flow bypass passageways to said annular chamber is substantially less than the flow resistance through the portion of said annular space from said first annular end to said annular chamber, thereby reducing the circumferential flow of said portion of said fluid passing from said high pressure chamber through said annular space to said low pressure chamber.

24. An apparatus in accordance with claim 23 wherein said inlet passageway extends through said housing.

25. An apparatus in accordance with claim 24, further comprising first, second, and third annular sealing means for sealing the annular space between the second annular surface of said annular labyrinth seal element and a surface which is radially adjacent to said second annular surface of said annular labyrinth seal element, said first annular sealing means being located between said first annular end and said third annular groove, said second annular sealing means being located between said third annular groove and said first annular groove, said third annular sealing means being located between said first annular groove and said second annular groove, and said fourth annular sealing means being located between said second annular groove and said second annular end.

26. An apparatus in accordance with claim 1 further comprising a third plurality of flow bypass passageways, each of said third plurality of flow bypass passageways being stationary and extending from a predetermined openings in said high pressure chamber to a respective one of a fifth plurality of circumferentially spaced-apart openings, said fifth plurality of circumferentially spaced-apart openings being located in an annular chamber formed between a third predetermined adjacent pair of said annular teeth, said fifth plurality of circumferentially spaced-apart openings being spaced at least substantially uniformly about the circumference of said annular chamber, wherein the flow resistance from said high pressure chamber through said third plurality of flow bypass passageways to said annular chamber is substantially less than the flow resistance through the portion of said annular space from said first annular end to said annular chamber, thereby reducing the circumferential flow of said portion of said fluid passing from said high pressure chamber through said annular space to said low pressure chamber.

27. An apparatus in accordance with claim 26, wherein each of first, second, and third plurality of flow bypass passageways is located entirely in said annular labyrinth seal element.

28. An apparatus in accordance with claim 27, wherein said predetermined opening in said high pressure chamber comprises a plurality of openings in said first annular end which are spaced at least substantially uniformly in a circular array, corresponding in number to said third plurality of flow bypass passageways, each of said third plurality of flow bypass passageways having a first portion extending at least generally parallel to the longitudinal axis of said rotatable shaft to intersect a respective one of the plurality of openings in said first annular end and having a second portion extending from a respective one of said fifth plurality of circumferentially spaced-apart openings in said annular chamber to intersect the associated first portion.

29. An apparatus in accordance with claim 27, further comprising first and second annular sealing means for sealing the annular space between the second annular surface of said annular labyrinth seal element and a surface which is radially adjacent to said second annular surface of said annular labyrinth seal element, said first annular sealing means being located between said first annular end and said first annular groove, said first annular groove being located between said first annular sealing means and said second annular sealing means.

30. An apparatus in accordance with claim 27, further comprising an annular rotating element positioned coaxially on said rotatable shaft for rotation therewith about said longitudinal axis of said rotatable shaft, said annular rotating element constituting a rotatable element, wherein said annular labyrinth seal element is secured to said housing, and wherein said radially adjacent surface is an annular portion of a circumferentially extending outer surface of said annular rotating element.

31. An apparatus in accordance with claim 1 further comprising a second annular groove, said second annular groove being located in said second annular surface of said annular labyrinth seal element, a fifth plurality of circumferentially spaced-apart openings, said fifth plurality of circumferentially spaced-apart openings being located in said second annular groove; and inlet passageway extending from an opening in said high pressure chamber to said second annular groove, a third plurality of flow bypass passageways, each of said third plurality of flow bypass passageways extending from a respective one of said fifth plurality of circumferentially spaced-apart openings in said second annular groove to a respective one of a sixth plurality of circumferentially spaced-apart openings, said sixth plurality of circumferentially spaced-apart openings being located in an annular chamber formed between a third predetermined adjacent pair of said annular teeth, said third predetermined adjacent pair of said annular teeth being located between said first predetermined adjacent pair of said annular teeth and said first annular end, said sixth plurality of circumferentially spaced-apart openings being spaced at least substantially uniformly about the circumference of said annular chamber, wherein the flow resistance from said high pressure chamber through said inlet passageway and said third plurality of flow bypass passageways to said annular chamber is substantially less than the flow resistance through the portion of said annular space from said first annular end to said annular chamber, thereby reducing the circumferential flow of said portion of said fluid passing from said high pressure chamber through said annular space to said low pressure chamber.

32. An apparatus in accordance with claim 31 wherein said inlet passageway extends through said housing.

33. An apparatus in accordance with claim 31, further comprising first, second, and third annular sealing means for sealing the annular space between the second annular surface of said annular labyrinth seal element and a surface which is radially adjacent to said second annular surface of said annular labyrinth seal element, said first annular sealing means being located between said first annular end and said second annular groove, said second annular sealing means being located between said second annular groove and said first annular groove, and said third annular sealing means being located between said first annular groove and said second annular end.

34. An apparatus in accordance with claim 1, wherein said housing has a fluid inlet and a fluid outlet, wherein at least one centrifugal fluid empeller is secured to said rotatable shaft for rotation therewith about the longitudinal axis of said rotatable shaft and for reaction with fluid passing from said fluid inlet to said fluid outlet such that said fluid exists at said low pressure in said low pressure chamber and at said high pressure in said high pressure chamber, wherein said impeller has an impeller cover secured to said impeller for rotation therewith, wherein each of said impeller and said impeller cover constitutes a rotatable element, and wherein said annular labyrinth seal element is secured to said housing.

35. An apparatus in accordance with claim 1, wherein said annular labyrinth seal element is secured to said housing.

36. An apparatus in accordance with claim 1, further comprising an annular rotating element positioned coaxially on said rotatable shaft for rotation therewith about said longitudinal axis of said rotatable shaft, said annular rotating element constituting a rotatable element, wherein said annular labyrinth seal element is secured to said housing, and wherein said radially adjacent surface is an annular portion of a circumferentially extending outer surface of said annular rotating element.

37. An apparatus in accordance with claim 36 wherein said annular rotating element is a balance piston.

* * * * *

UNITED STATES PATENT AND TRADEMARK OFFICE
CERTIFICATE OF CORRECTION

PATENT NO. : 5,161,943

DATED : November 10, 1992

INVENTOR(S) : Martin D. Maier et al

It is certified that error appears in the above-identified patent and that said Letters Patent is hereby corrected as shown below:

Column 2, line 11, change "labyrinth- seal" to --labyrinth seal--.

Column 2, line 46, delete "o", and "Fig. 5" should start a new paragraph.

Column 3, line 36, change "outlet !8" to --outlet 18--.

Column 5, line 35, change "ridge$ like" to --ridge-like--.

Column 6, line 2, change "element Labyrinth" to --element. Labyrinth--.

Column 7, line 24, change "holes !08" to --holes 108--.

Column 7, lines 38-39, change "holes !20" to --holes 120--.

Column 11, line 13, change "spaced apart" to --spaced-apart--.

Column 12, line 5, change "int he" to --in the--.

Column 13, line 65, change "and third" to --third and fourth--.

Column 14, line 15, change "openings" to --opening--.

UNITED STATES PATENT AND TRADEMARK OFFICE
CERTIFICATE OF CORRECTION

PATENT NO. : 5,161,943

DATED : November 10, 1992

INVENTOR(S) : Martin D. Maier et al

It is certified that error appears in the above-identified patent and that said Letters Patent is hereby corrected as shown below:

Column 15, line 9, change "and" to --an--.

Column 16, line 13, change "empeller" to --impeller--.

Signed and Sealed this

Second Day of November, 1993

Attest:

BRUCE LEHMAN

Attesting Officer

Commissioner of Patents and Trademarks